United States Patent [19]

West

[11] 4,425,821
[45] Jan. 17, 1984

[54] ENGINE BALANCER
[75] Inventor: Floyd G. West, Crete, Ill.
[73] Assignee: Allis-Chalmers Corporation, Milwaukee, Wis.
[21] Appl. No.: 214,641
[22] Filed: Dec. 10, 1980
[51] Int. Cl.³ .................. F02B 75/06; F16C 3/04
[52] U.S. Cl. .................................. 74/604; 123/192 B
[58] Field of Search .............. 74/603, 604; 123/192 B

[56] References Cited

U.S. PATENT DOCUMENTS

| | | | |
|---|---|---|---|
| 1,592,237 | 7/1926 | Walker | 74/603 |
| 3,163,117 | 12/1964 | Haentjens | 74/573 |
| 3,667,317 | 6/1972 | Hillingrathner | 74/604 |
| 3,962,932 | 6/1976 | Okamato et al. | 74/604 |
| 4,300,493 | 11/1981 | Berti | 123/172 B |

FOREIGN PATENT DOCUMENTS 1273900 10/1959 Fed. Rep. of Germany .

Primary Examiner—Lawrence J. Staab
Assistant Examiner—Michael D. Bednarek
Attorney, Agent, or Firm—Arthur L. Nelson

[57] ABSTRACT

An engine balancer for a four cylinder engine for balancing secondary unbalance forces. The balancer is a Lanchester balancer having cylindrical counterweights with provisions for aligning the counterweights, the gears and the crankshaft in the assembly on the engine.

10 Claims, 8 Drawing Figures

ENGINE BALANCER

This invention relates to an engine balancer, and more particularly to a Lanchester balancer having cylindrical counterweights and provisions for alignment of the counterweights with the gears and crankshaft to assure proper balancing on assembly.

The conventional four cylinder internal combustion engine has a crankshaft arrangement in which the crankarms on each of the ends of the crankshaft are 180 degrees out of phase with two center crankarms. Assuming that the main concern in balancing is in overcoming the primary and secondary forces caused by an unbalance of the crankarms and the crankpins relative to the center of rotation of the crankshaft on its main bearings. The crankarms are integral with the crankpins which rotatably support the large ends of the connecting rods which further increases the mass which rotates eccentrically about the axis of the rotation of the main bearings. The portion of each of the crankarms and the mass of the large bearing of the connecting rod is usually counterbalanced by a counterweight on the crankshaft. Frequency of these forces is the frequency of the engine speed. Since the four cylinder engine end crankarms are 180 degrees out of phase with the two center crankarms, the primary forces essentially counterbalance each other.

Accordingly, balancing of the secondary forces are of main concern in an engine of this type. The secondary forces are produced by the piston and the connecting rod connected to each crankarm. These forces are basically reciprocating forces and are essentially directed in a vertical plane. They are brought into existence by the angularity of the connecting rod and the varying ratio of the rod to the crankarm length and these forces are produced at a rate of twice the frequency of the primary forces or twice the frequency of the engine speed. Accordingly, these forces are considered forces of secondary order since their frequency is twice that of the engine speed with the secondary forces being twice the frequency of the primary forces. The secondary forces operate in the same direction and each crankarm and connecting rod produce forces of the same magnitude and in the same direction. The result of the secondary forces in a four cylinder engine of this design is four times the forces of any one cylinder in the engine. Accordingly, the unbalanced secondary forces can develop a considerable resultant force and an engine balancer must be incorporated in the engine.

Lanchester balancers have been used on the engines as illustrated in the Hillingrathner U.S. Pat. No. 3,667,317 and the Sykes, Jr. U.S. Pat. No. 2,914,137. These patents generally illustrate the Lanchester balancer in which the counterweights are rotating at twice the frequency of the engine and the counterweights counterbalance each other in the lateral direction and produce a balancing force only in the vertical direction. The counterweights as shown in these patents, however, are mounted on the shafts with the gears and by increasing the weight on the one side of the shaft produce an unbalance. These forces are used to counterbalance secondary unbalance of an engine. No provision for aligning of the crankshaft counterweights is shown. It is not provided, since the gear and counterweight are an integral construction. Accordingly, the applicant has provided for a cylindrical counterweight which is adjustably mounted on the shaft and can be aligned through an aligning means provided for use in assembly of the components of the balancer and assembling the balancer on the engine.

It is an object of this invention to provide an engine balancer for a four cyinder in line engine.

It is another object of this invention to provide a balancer having cylindrical counterweights which are adjustably positioned on the shafts of the driving gears.

It is a further object of this invention to provide an engine balancer having alignment means for aligning the crankshaft, drive gears, and counterweights in assembling of the balancer and mounting of the balancer on the engine.

The objects of this invention are accomplished by providing Lanchester balancer mounted underneath the crankshaft essentially in the center portion of the engine. The counterweight drive gears are driven by a gear on the crankshaft and are driven at twice the engine speed. The counterweights are cylindrical and consist of an eccentric shaft opening for mounting on the drive gear shaft with capscrews for adjustably tightening the counterweights on the drive shafts. An alignment means is also provided on the balancer in which a pin can be inserted in holes through the drive gear, the housing, and the counterweight. This automatically aligns the components so that the counterweights can be tightened on the drive shaft in a balanced position and in phase with the crankshaft and pistons. Balancing can be easily done by the use of the pin which is inserted through the drive gear housing and counterweight. Subsequent to this alignment, the counterweights are aligned in a vertical plane when the crankshaft is set with the number one cylinder at top dead center as the counterweight assembly is installed. This provides a balancer positioned for the engine to assure a balanced condition for the engine.

Referring to the drawings.

Figure 1:
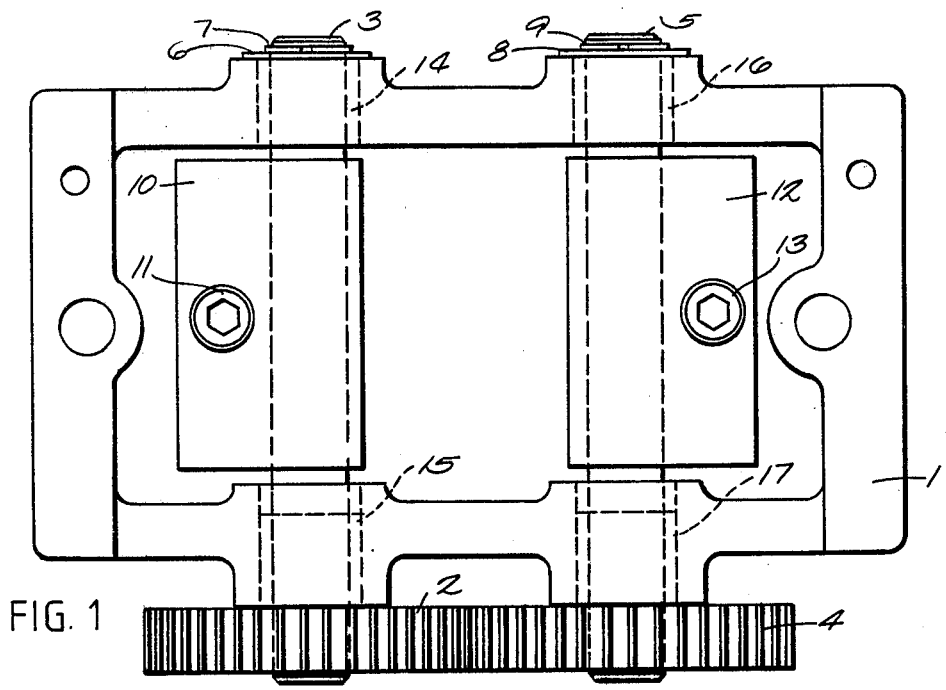
FIG. 1 illustrates a plan view of the balancer.

Referring to FIG. 1, the housing 1 supports a counterweight drive gear 2 and shaft 3 as well as the counterweight driven gear 4 and drive shaft 5. The shaft 3 is held on by a washer 6 and a snap ring 7 on the end of the shaft. Similarly, the washer 8 and snap ring 9 holds on the shaft 5. The counterweight 10 is supported on the shaft 3 and locked in position by a capscrew 11. The counterweight 12 is fastened by the capscrew 13 on the shaft 5. The shaft 3 is rotatably mounted in the bearing assemblies 14 and 15. The shaft 15 is rotatably supported in the bearing assemblies 16 and 17.

The cover 18 is fastened on the underside of the housing 1 by a plurality of screws of which 19 and 20 are shown. The gears 2 and 4 are shown with the alignment holes 21 and 22 which are aligned with openings in the housing of which opening 23 is shown and also the opening 24 in the end of the counterweight 12.

The counterweight 12, for the purpose of illustration, is illustrated. The opening 24 is shown in the end of the counterweight and the opening 25 is shown in the opposite end of the counterweight to permit reversibility of the counterweights. A shaft opening 27 is shown eccentric to the center of the counterweight with a slot 28 which forms a gap to allow tightening on the shaft when the cap screw is tightened in the threaded opening 29. A counterbored portion 30 is provided to recess the head of the capscrew.

Figure 7:
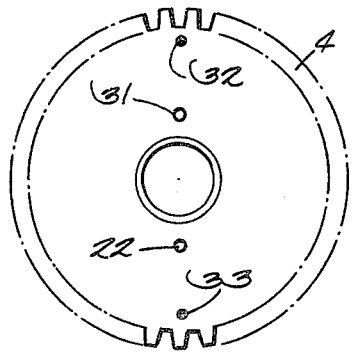
FIG. 7 is a side view of the drive gear.
Figure 8:
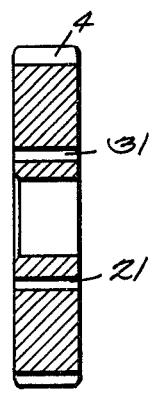
FIG. 8 is a section view of the drive gear.

FIGS. 7 and 8 show the driven gear 4 for purposes of illustration in which the alignment holes 22 and 31 are shown. Each of the gears is also provided with punch marks 32 and 33 which are used for alignment of the gears in the vertical position when they are assembled in the housing and also to position them horizontally with the weights in the vertical position when the engine is positioned with the number one cylinder in top dead center.

Operation of the device will be described in the following paragraphs.

Counterweights 10 and 12 are constructed of a cylindrical bar stock with a shaft opening eccentrically bored in the counterweight. A slot 28 is also provided in each of the counterweights to allow a capscrew in the threaded opening 29 to tighten the counterweight on the shaft. Each of the gears 2 and 4 are fastened to a shaft 3 and 5 as illustrated. The shaft and gear are rotatably mounted in the housing 1. Assembly is fastened by the washers and retainer rings as shown in FIG. 1.

Figure 2:
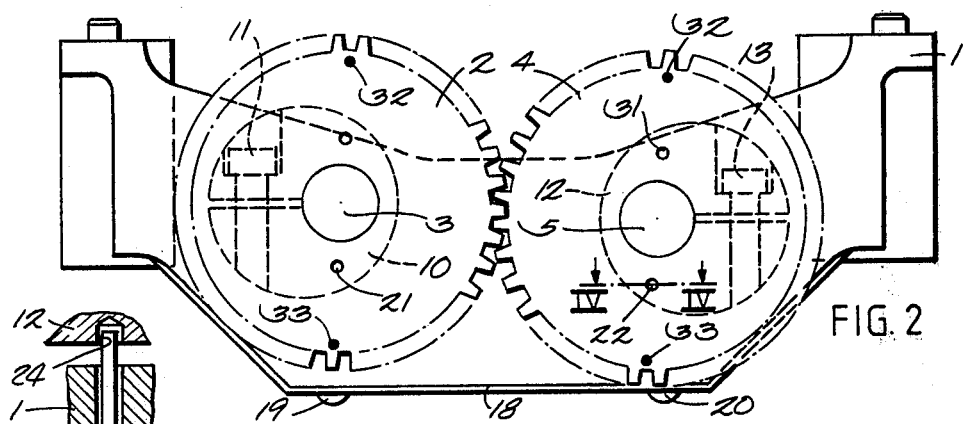
FIG. 2 illustrates an end view of the balancer in the gear and counterweight alignment position.
Figure 4:
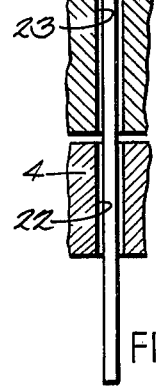
FIG. 4 is a view taken on line IV—IV of FIG. 2 of the alignment pin aligning the drive gear, and the counterweight through an opening in the housing.
Figure 5:
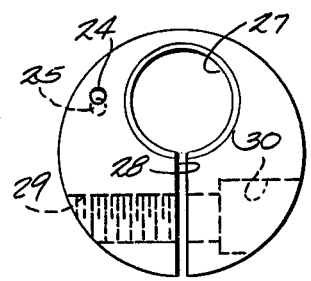
FIG. 5 is an end view of the counterweight.
Figure 6:
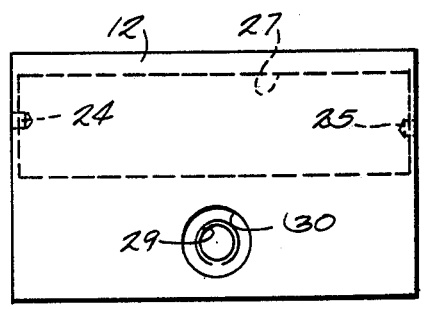
FIG. 6 is a top view of the counterweight.
Figure 3:
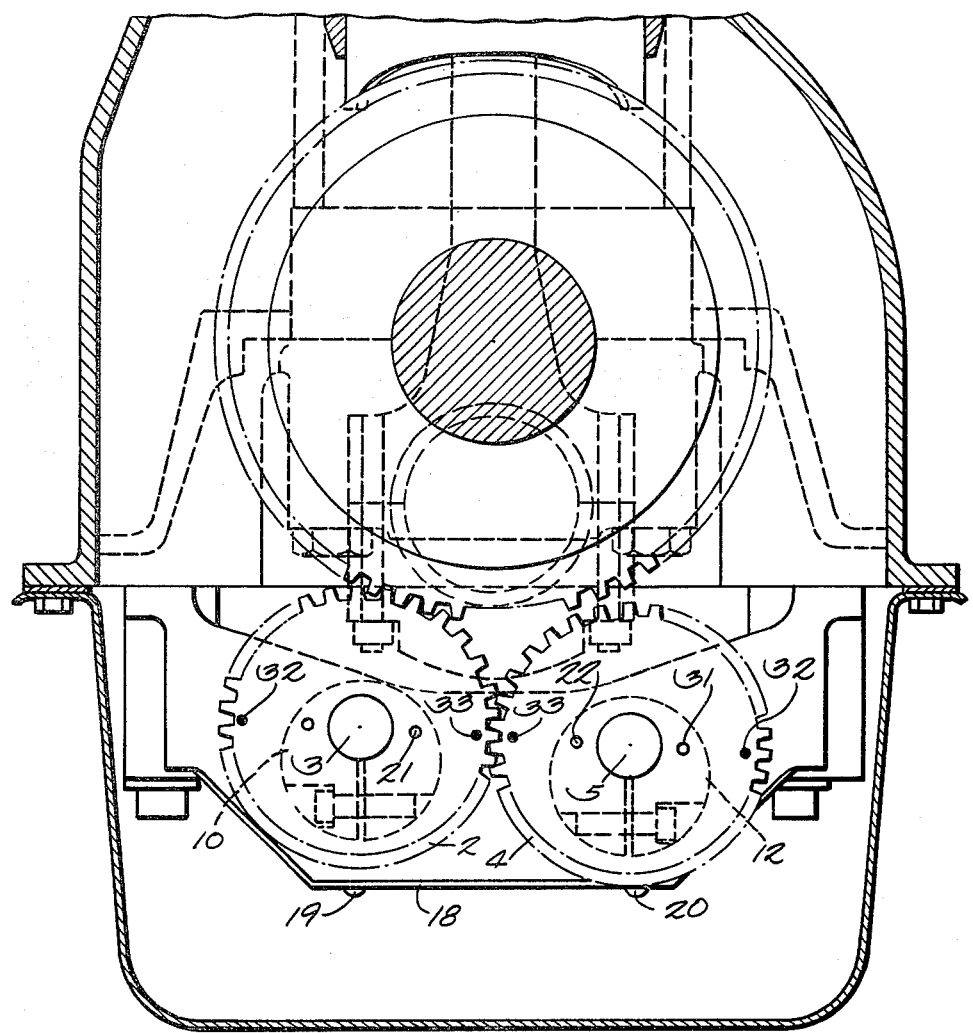
FIG. 3 illustrates an end view of the balancer showing the balancer position for the counterweights when the crankshaft is with the number one cylinder at top dead center.

Aligning the counterweights properly on the shafts with the gears is provided by rotating to the position as shown in FIG. 2. In this position the pin is inserted in the opening as shown in FIG. 4 in which the pin aligns the gear 4, counterweight 12 and housing 1. The counterweights are then tightened on the shaft to assure that they will not loosen. The punch marks 32 and 33 are aligned in FIG. 2 as shown. The counterweights and gears are rotated to the position as shown in FIG. 3 in which the punch marks are horizontal and the counterweights are vertically positioned. The crankshaft number one cylinder is then at top dead center. In its position the balancer is then assembled at the engine and the proper alignment of the gears and counterweights is assured.

The embodiments of the invention in which an exclusive property or privilege is claimed are defined as follows:

1. An engine balancer on a four cylinder in line engine comprising, a crankshaft rotatably mounted on its axis of rotation, a plurality of main bearings rotatably supporting the crankshaft, an engine balancer mounted underneath said crankshaft including pairs of counterweights eccentrically mounted on counterweight shafts on axes of rotation parallel to the crankshaft axis, a crankshaft drive gear drivingly connected to said crankshaft for driving counterweight gears, a housing supporting said counterweight gears and counterweight shafts, one of said counterweights mounted on each of said counterweight shafts, means defining an eccentric shaft opening for receiving the counterweight shafts for driving said counterweights, a slot extending axially the length of said counterweight, a fastening means for adjustably clamping said counterweight on each of said counterweight shafts, alignment means including aligning holes on said counterweight gears, said housing and said counterweights for providing alignment adapted for receiving a pin to provide alignment of components.

2. An engine balancer on a four cylinder in line engine as set forth in claim 1 wherein each counterweight defines a cylindrical configuration.

3. An engine balancer on a four cylinder in line engine as set forth in claim 1 including means defining an aligning drilled hole in said counterweight.

4. An engine balancer on a four cylinder in line engine as set forth in claim 1 wherein said counterweights define alignment openings on each of their ends providing reversibility for selectively positioning on either of said shafts.

5. An engine balancer on a four cylinder in line engine as set forth in claim 1 wherein each of said counterweights define a cylindrical configuration.

6. An engine balancer on a four cylinder in line engine as set forth in claim 1 including end supports in said housing for supporting said shaft on both ends of said counterweight.

7. An engine balancer on a four cylinder in line engine as set forth in claim 1 wherein said housing defines surfaces adjacent said counterweights and said gears for defining a relatively short clearance between said counterweights, the gear, and said housing.

8. An engine balancer on a four cylinder in line engine as set forth in claim 1 including an engine block supporting said main bearings, means supporting said housing on the engine block.

9. An engine balancer on a four cylinder in line engine as set forth in claim 1 including, means defining a countersunk screw thread opening in said counterweight for recessing the head of a capscrew.

10. An engine balancer on a four cylinder in line engine as set forth in claim 1 including means defining said countershaft openings adjacent the side of said counterweight to allow deformation in tightening on said countershafts.

* * * * *